Sept. 15, 1964
H. LIST
3,148,887
GAS-TIGHT SEALING CONNECTION FOR HYDROFLUORIC ACID REACTION
FURNACE BETWEEN SCREW CONVEYOR CHARGING DEVICE AND
ROTATING NECK OF THE FURNACE
Filed July 24, 1961
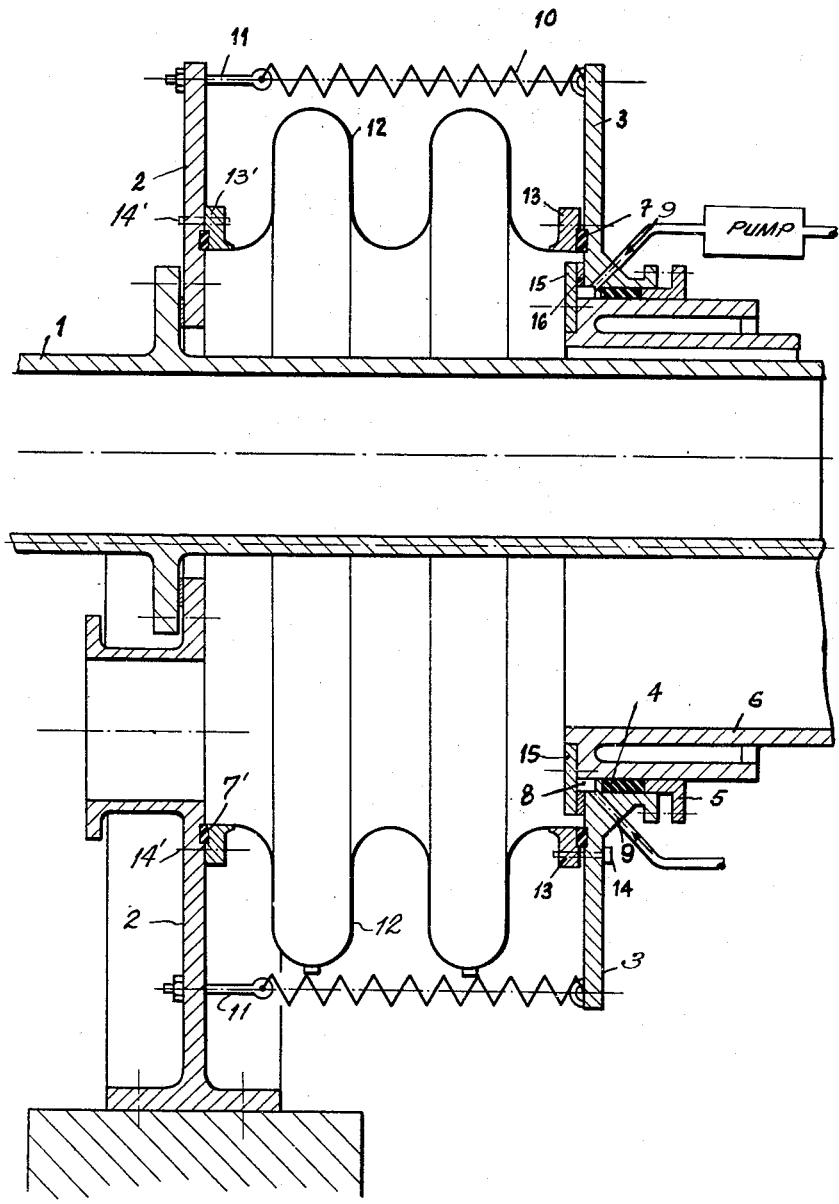
INVENTOR
HEINZ LIST
BY
Abraham A. Saffitz
ATTORNEY

United States Patent Office 3,148,887
Patented Sept. 15, 1964

3,148,887
GAS-TIGHT SEALING CONNECTION FOR HYDROFLUORIC ACID REACTION FURNACE BETWEEN SCREW CONVEYOR CHARGING DEVICE AND ROTATING NECK OF THE FURNACE
Heinz List, St. Jakobstrasse 43, Pratteln, near Basel, Switzerland
Filed July 24, 1961, Ser. No. 126,245
3 Claims. (Cl. 277—65)

The present invention relates to a gas-tight connection arrangement between stationary and rotating parts, suitable in particular for reaction furnaces for the production of hydrofluoric acid.

In the production of hydrofluoric acid fluor spar is led out of a silo by means of a screw conveyor or charging device into a reaction furnace. In the screw conveyor charging device the fluor spar is mixed with sulphuric acid whereby the initial part of the chemical reaction occurs in the mixer and the final reaction occurs in the reaction furnace. The reaction furnace is constructed in the form of a rotary furnace in which the inlet end is connected to the screw conveyor charging mixer. The invention provides an improvement of the sealing means between the charging mixer and the rotating reaction furnace, said sealing means making a gas-tight connection which comprises at least one chamber which is provided between the stuffing boxes and the slip-ring seals and which is filled which an inert pumpable material.

The pumpable material may advantageously be maintained under an excess pressure.

According to a preferred form of embodiment of the subject of the invention the chamber is in connection with a pump which maintains the pumpable material under pressure.

In the accompanying drawing an example of embodiment of the gas-tight connection arrangement according to the invention is illustrated in sectional elevation.

The screw conveyor charging mixer, which is suitably constructed as a mixing- and kneading-worm, is provided with an outlet pipe 1 which is supported on a support 2, this support 2 serves for supporting the housing (not shown) of the screw conveyor arrangement. In structural association with the support 2 there is provided a sealing plate 3 and a stuffing box 4 having a stuffing box gland 5; the sealing plate 3 which is spaced from the support 2 serves for the mounting of connection bellows 12, one end of the connection bellows being secured to the sealing plate 3 by sealing flange 13 and the other of the connection bellows being secured to the support 2 by a similar sealing flange 13'. The stuffing box gland 5 surrounds the rotatable neck 6 of the rotating reaction furnace.

The stuffing box 4 forms a seal between the rotating neck 6 of the rotating reaction furnace and the stationary sealing plate 3. A further seal is obtained by means of a sealing ring 7 which is inserted between the sealing plate 3 and the sealing flange 13 which secures the end of bellows 12 to sealing plate 3 and a similar sealing ring 7' is inserted between the sealing flange 13' and the support 2 at the other end of bellows 12. The sealing flange 13 is pressed and sealed tightly against the sealing plate 3 by means of screws 14 and similarly screws 14' are provided for a tight pressure connection to plate 2 at sealing flange 13' at the other end of the bellows 12, an additional connection between the support 2 and the sealing plate 3 is provided by means of a tensioning connection outside of the bellows 12; this connection outside of the bellows is provided by a spring and bolt arrangement with adjustable tension bolt 11 mounted in plate 2 and tension spring 10 connected at one end to bolt 11 and at the other end to sealing plate 3, this arrangement providing a spring connection between sealing plate 3 and support 2 through tension springs 10 and tension bolts 11. To insure a gas-tight connection between the rotating neck 6 of the furnace and the sealing plate 3 at the inner connection between the sealing plate and neck, a slip-ring 16 is inserted between the flange 15 of the neck 6 and the sealing plate 3. In order to maintain slip-ring 16 connection between flange 15 and plate 3 gas-tight, an annular chamber 8 is provided between the stuffing box 4 and the slip-ring 16. The annular chamber 8 is filled with a pumpable paste material which possesses sealing properties and remains inert with respect to gas or other substances present in the reaction furnace. As examples of such paste there may be used a bitumen-graphite mixture or a polyethylene wax. The paste is fed into the annular chamber 8 by means of bores 9 communicating between the chamber and extending through the sealing plate 3 to the outside thereof.

It is further advantageous to heat or cool the chamber 8 so that the sealing material is always in a viscous or pasty condition. In order to increase the effect of the sealing function provided by the pumpable material, the paste is maintained under pressure and for this purpose there is connected to one of the bore holes 9 a pump which puts the pumpable material under pressure.

Finally it is mentioned that by means of the pump referred to the pumpable material may be recycled so that the fluid paste is trapped and returned again to the pumping circuit.

The described gas-tight connection arrangement can be used not only for reaction furnaces, but also for sealing between other stationary and rotating parts.

What I claim is:

1. A gas-tight sealing connection for hydrofluoric acid reaction furnace between a screw conveyor charging device and the rotating neck of a rotating reaction furnace comprising a stationary plate support mounted on the housing of the screw conveyor charging device adjacent the connection of said conveyor to the neck of the furnace, a stationary sealing plate mounted about the rotating neck of the furnace which is spaced from said stationary plate support, a connection bellows mounted between said stationary sealing plate and said support plate surrounding the outlet of said screw conveyor charging device and the neck, adjustable bolt and spring tensioning means connected to said support and sealing plate urging them together and aiding the sealing function of said bellows, a stuffing box and stuffing box gland interposed between the outer upper surface of said rotating neck of said furnace and said stationary sealing plate, a sealing ring on the outer surface of said sealing plate, retaining means attaching the bellows to said stationary sealing plate which also bears against said sealing ring, the outer surface of said rotating neck being offset from the stuffing gland to define an annular chamber, a pumpable inert sealing paste in said annular chamber, a slip ring seal defining the boundary of the surface of said annular chamber, bores extending through said sealing plate in communication with said annular chamber, and a pump for maintaining said sealing paste under pressure while circulating through said annular chamber.

2. A gas-tight sealing connection as claimed in claim 1 wherein said inert sealing paste is a mixture of bitumen and graphite.

3. A gas-tight sealing connection as claimed in claim 1 wherein said inert sealing paste is a polyethylene wax.

References Cited in the file of this patent

UNITED STATES PATENTS

| | | |
|---|---|---|
| 1,972,394 | Radford | Sept. 4, 1934 |
| 2,075,148 | Svenson | Mar. 30, 1937 |
| 2,100,220 | King | Nov. 23, 1937 |
| 2,577,292 | Weber | Dec. 4, 1951 |
| 2,756,081 | Husman | July 24, 1956 |
| 2,799,522 | King et al. | July 16, 1957 |
| 2,863,680 | Taltavall | Dec. 9, 1958 |
| 2,943,874 | Valdi et al. | July 5, 1960 |